US008108323B2

(12) United States Patent
Weinberger et al.

(10) Patent No.: US 8,108,323 B2
(45) Date of Patent: Jan. 31, 2012

(54) DISTRIBUTED SPAM FILTERING UTILIZING A PLURALITY OF GLOBAL CLASSIFIERS AND A LOCAL CLASSIFIER

(75) Inventors: Kilian Quirin Weinberger, Mountain View, CA (US); John Langford, White Plains, NY (US)

(73) Assignee: YAHOO! Inc., Sunnyvale, CA (US)

( * ) Notice: Subject to any disclaimer, the term of this patent is extended or adjusted under 35 U.S.C. 154(b) by 917 days.

(21) Appl. No.: 12/123,270

(22) Filed: May 19, 2008

(65) Prior Publication Data

US 2009/0287618 A1 Nov. 19, 2009

(51) Int. Cl.
*G06F 15/16* (2006.01)
*G06N 5/02* (2006.01)

(52) U.S. Cl. ............................. 706/10; 709/205; 709/224
(58) Field of Classification Search ................... 706/12; 709/206, 205, 224
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,415,318 B1 | 7/2002 | Aggarwal et al. | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,892,189 B2 * | 5/2005 | Quass et al. | 706/12 |
| 6,957,259 B1 | 10/2005 | Malik | |
| 7,120,455 B1 | 10/2006 | Chen et al. | |
| 7,257,842 B2 | 8/2007 | Barton et al. | |
| 7,272,853 B2 * | 9/2007 | Goodman et al. | 726/13 |
| 7,373,385 B2 | 5/2008 | Prakash | |
| 7,475,118 B2 * | 1/2009 | Leiba et al. | 709/206 |
| 7,711,779 B2 * | 5/2010 | Goodman et al. | 709/206 |
| 2003/0140103 A1 | 7/2003 | Szeto et al. | |
| 2004/0177110 A1 | 9/2004 | Rounthwaite et al. | |
| 2004/0255122 A1 | 12/2004 | Ingerman et al. | |
| 2006/0036695 A1 * | 2/2006 | Rolnik | 709/206 |
| 2007/0112954 A1 | 5/2007 | Ramani et al. | |
| 2007/0192863 A1 | 8/2007 | Kapoor et al. | |

OTHER PUBLICATIONS

R. Segal, Combining global and personal anti-spam filtering. Proc. of the 4th Conference on Email and. Anti-Spam (CEAS), pp. 1-8, 2007.*

(Continued)

*Primary Examiner* — Jeffrey A Gaffin
*Assistant Examiner* — Ola Olude-Afolabi
(74) *Attorney, Agent, or Firm* — Frommer Lawrence & Haug LLP; Jamie L. Wiegand

(57) ABSTRACT

Embodiments are directed towards using a community of weighted results from local and global message classifiers to determine whether a message is spam. Each local classifier may receive a message that is to be evaluated to determine whether it is spam. A local classifier receives the message and performs a classification of the message. The local classifier may receive predictions of whether the message is spam from at least one global classifier. The local and global predictions are combined using, in one embodiment, a regression analysis to generate a single local message classification. Combining the local and global predictions is directed towards enabling a community of predictions to be used to classify messages. The user may then re-classify this output, which in turn is used as feedback to modify weights to the local and received global predictions for a next message.

20 Claims, 5 Drawing Sheets

OTHER PUBLICATIONS

"Bloom Filter," Wikipedia, the free encyclopedia, 7 pgs., http://en.wikipedia.org/wiki/Bloom_filter (accessed May 22, 2007).

Dhamija, Rachna, "Security Skins: Embedded, Unspoofable Security Indicators," Jun. 19, 2006, 57 pgs., Harvard University.

Dhamija, Rachna et al., "Why Phishing Works," Apr. 2006, 10 pgs.

Dhamija, Rachna et al., "The Battle Against Phishing: Dynamic Security Skins," Jul. 2005, 12 pgs.

Registration Demonstration; Sign-in From New Device; Sign-in Demonstration, 20 pgs., http://passmarksecurity.breezecentral.com/p70238971 (accessed Jun. 13, 2006).

Kristol, D. et al., "HTTP State Management Mechanism," Feb. 1997, 21 pgs., Network Working Group.

Taylor, Bradley, "Sender Reputation in a Large Webmail Service," 6 pgs., Google Inc.

Taylor, Bradley, "Sender Reputation in a Large Webmail Service CEAS 2006," Jul. 27, 2006, 19 pgs., Google Inc.

"Antivirus software," Wikipedia, the free encyclopedia, 4 pages, http://en.wikipedia.org/wiki/Virus_scanner, (accessed Nov. 27, 2007).

Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.

"Malware," Wikipedia, the free encyclopedia, 8 pages, http://en.wikipedia.org/wiki/Malware, (accessed Nov. 27, 2007).

"Instant messaging," Wikipedia, the free encyclopedia, 7 pages, http://en.wikipedia.org/wiki/Instant_messaging, (accessed Nov. 27, 2007).

International Search Report and Written Opinion, mailed Jan. 31, 2006 for Patent Application PCT/US04/35402 filed on Oct. 26, 2004.

Slashdot, FAQ—Comments and Moderation#cm600, http://slashdot.org/fq.com-mod.shtml, pp. 1-18, Nov. 15, 2007.

Flickr Community Guidelines, http:/flickr.com/guidelines.gne, pp. 1-3, Nov. 15, 2007.

Craigslist online community, craigslist help > flags and community moderation, http://www.craigslist.org/about/help/flags_and_community_moderation, updated Nov. 7, 2007.

* cited by examiner

DISTRIBUTED SPAM FILTERING UTILIZING A PLURALITY OF GLOBAL CLASSIFIERS AND A LOCAL CLASSIFIER

TECHNICAL FIELD

The present invention relates generally to managing messages over a network and, more particularly, but not exclusively to employing a weighted result of a local spam filter combined with results from a plurality of weighted global spam filters to determine whether a message is a spam message.

BACKGROUND

The problem of spam in established communication technologies, such as electronic mail, is well-recognized. Spam may include unsolicited messages sent by a computer over a network to a large number of recipients, Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

However, a sender of a large number of messages might not be considered a spammer. For example, an educational, financial institution, health institution, or the like, might send a large number of messages to its alumni, members, or the like. Similarly, known and/or generally acceptable merchants might send large number of messages that the recipients may actually want to receive. Such bulk message distributors may be well known by its recipients, who may actually seek to receive the messages. Thus, a sender of a large number of messages cannot be classified based solely upon the quantity of messages it sends. Because some recipients of the bulk messages may know and accept messages from these senders, filters need to be tuned to allow the messages to be delivered.

Moreover, many spammers have learned to tune their messages based on how a spam filter might classify their messages. For example, some spammers might send spam messages to themselves, and then tweak the message until it is no longer classified as spam. In this way, spammers may gain a lot of information about a spam filter and then generate messages that are typically not caught by spam filters used by others. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
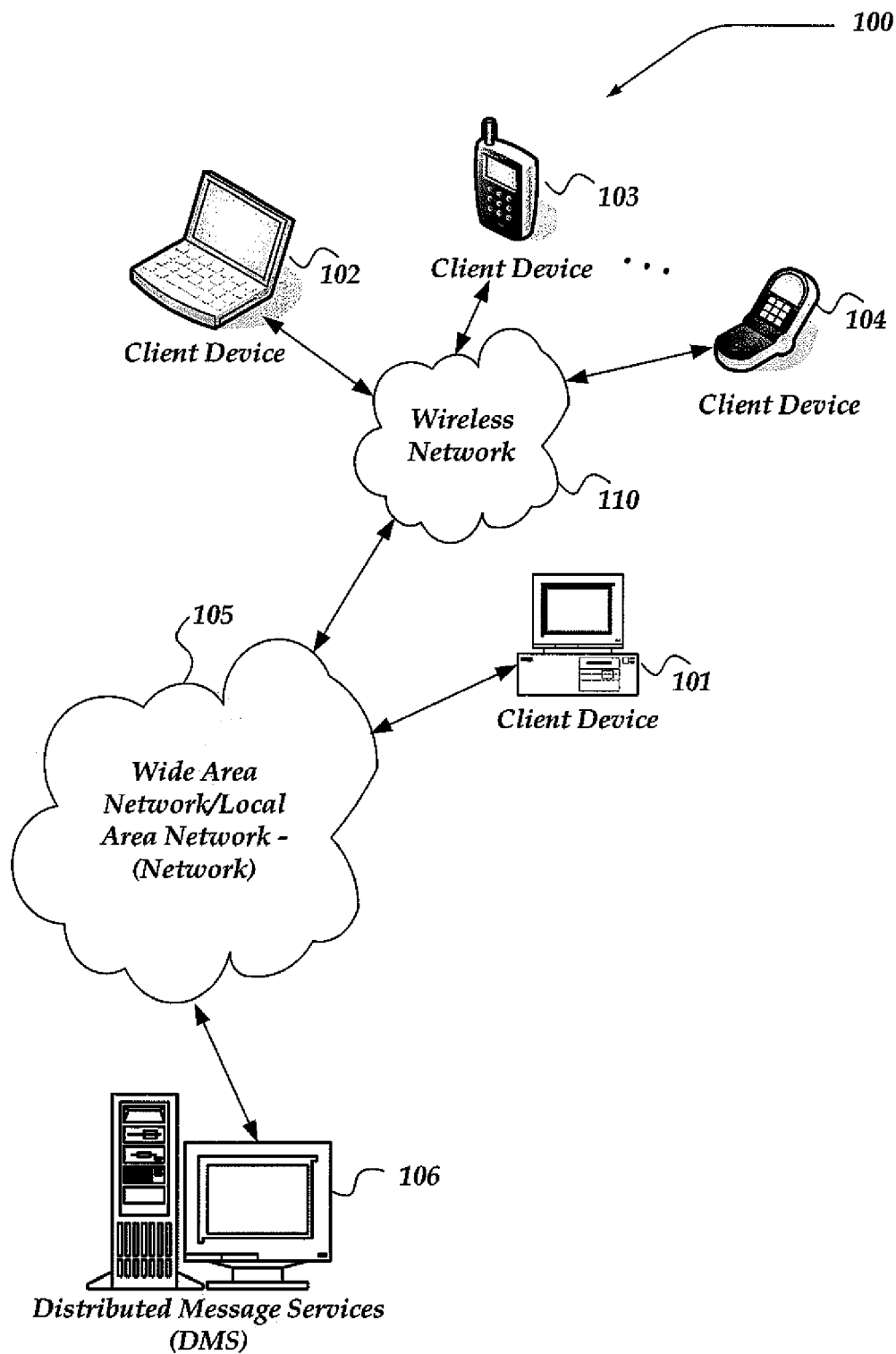
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "classifier" refers to any of a variety of message organization mechanisms useable to receive messages and to organize the messages based on some defined criteria. As used herein, the classifiers are directed towards organizing a given message based on a determination of whether the message is spam or some other type of message. As such, classifiers referred to herein may also be known as "spam filters." Such classifiers may employ a variety of mechanisms to make such a determination including, but not limited to examining message headers, from addresses, message routing information, message content (e.g., a message body), a message attachment, or the like.

Message classifiers may employ a variety of approaches to organize messages, including, but not limited to artificial intelligence approaches, various machine learning algorithms, or the like. Non-exhaustive examples include naïve Bayes, Support-Vector machines, logistic regression, perceptrons, Markovian discrimination approaches, neural networks, decision trees, or the like. Further, each of these algorithms may be employed different variations, such as regularization, feature weighting, or the like. Non-exhaustive examples of such classifiers include, but are not limited to CRM114 Discriminator, POPFile, DSPAM, SpanAssassin, SpamBayes, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards using a weighted result of a local message classifier combined with results from a plurality of weighted global message classifiers to determine whether a message is a spam message. By employing results from a plurality of global classifiers the resulting classification of a message may be resistant to spammer influence, while enabling sharing of feedback data with other message filters.

Message classification as described herein may include use of local classifiers and global classifiers. Classifiers may be deemed to be local when referenced to a given user account, message recipient address, or the like. Classifiers may be deemed to be global classifiers when their results are received from a message classifier other than one that is associated with the given user account, message recipient address, or the like. Briefly, a classifier may employ any of a variety of message filtering mechanisms, such as spam filtering, or the like. In one embodiment, each local classifier and global classifier may employ substantially similar mechanisms to classify a message. However, in another embodiment, at least one of the local or global classifiers may employ different mechanisms to classify a message than another classifier.

Each classifier may receive a message that is to be evaluated to determine whether it is spam or non-spam (sometimes called ham). One embodiment to classifying the received message employs at least a two layered approach. In a first layer, a local classifier receives the message and performs an initial classification of the message. In one embodiment, the local classifier may locally predict that the message is spam or not spam. In one embodiment, the local classifier may direct the message to a local user's spam message folder, a non-spam message folder (e.g., an inbox), or the like. In one embodiment, a user of the local classifier may select to re-classify the message. Several mechanisms may be employed by the local user in re-classifying the message, including, but not limited to moving the message to another folder, retaining the message in an existing folder, deleting the message without reading it (thereby moving the message to a deleted folder), or the like. In another embodiment, the local user may employ icons, buttons, widgets, or the like, that re-classify and possibly move the message. In any event, re-classification of the message by the local user may be fed back into the local classifier so that the local classifier may be trained. Such training may then be used by the local classifier to classify a next message received. Training of a local classifier may involve a variety of actions, including modifying internal parameters to the local classifier used to weight selected message features. Such message features may include, but are not limited to keywords or phrases found within a message body, message header, or the like. Features may also include various characteristics about a message source address including whether the source address is to be designated within a local white list, black list, or the like. Features are not limited to these, and a local classifier may also evaluate a variety of other characteristics of a message including a message size, attachments to the message, whether the message is sent to a plurality of other users, such as through a distribution list, or the like. By training the local classifier, the local classifier may modify its internal weighting scheme, or other algorithms, and/or criteria used to classify messages.

In a second layer, the local classifier may receive predictions of whether the message is spam or not spam from at least one global classifier. In one embodiment, the at least one received global prediction is combined with the local prediction to generate a single message classification. The local and global predictions may be combined using any of a variety of mechanisms. For example, in one embodiment, regression analysis may be used to weight the various inputs and generate a single message classification. The user may then re-classify this output, which in turn is used as an input to the regression analysis to modify weights to the local and received global predictions for a next message. The feedback from the user may also be used to further train the user's local classifier.

Thus, in a first layer, one local classifier may be used per user to solve the question "is this message spam for this user based on an evaluation local to the user?" The second layer then may employ one distributed filtering mechanism per user to solve the question "is this message spam for the user given inputs about the message from a plurality of other users and the local user?"

Similarly, each other user's local classifier may receive predictions from still other users' classifiers such that each user's local classifier may be influenced by not only inputs from the local user but also from a community of users. Thus, message classification may benefit from a community perception whether than merely isolated individual perceptions.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-106, and Distributed Message Services (DMS) 106.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as DMS 106, or the like. Such user account, for example, may be configured to enable the user to receive emails, send/receive IM messages, SMS messages, access selected web pages, or participate in a social networking activity. However, managing of messages or otherwise participating in other social activities may also be performed without logging into the user account.

A user of client devices 101-104 may employ any of a variety of client applications to access content, read web pages, receive/send messages, or the like. In one embodiment, each of client devices 101-104 may include an application, or be associated with an application that resides on another network device, that is useable to filter or otherwise classify received messages. Message classifiers that are associated with a particular client device, particular user, or user's message account, address, or the like, are defined as local message filters, or local classifiers. Message classifiers employed by other user's are defined as global classifiers. For example, a message classifier for client device 101 is a local classifier to client device 101, but a global classifier to each of client devices 102-104. Similarly, a message classifier that is local to client device 102 would be considered as a global classifier by client devices 101, and 103-104, and so forth. Again, while a message classifier may reside within a given client device. The invention is not so limited, and a message classifier for a given client device, user, user account, or the like, may also reside remotely, such as within DMS 106, or the like.

In any event, such message classifiers are directed towards evaluating a message to determine whether the message is a spam message, or not Various message classifiers may further determine whether a message includes, or might include, a virus, Trojan horse, malware, or the like. The message classifiers may be configured and arranged to examine various features of a message to make such a determination. Many of these message classifiers may include a training period, or on-going training configuration, where the message classifier might determine whether a message is spam or not, based on input from a user, a current folder location of a message, or the like. In one embodiment, such training might include changing a weight that the message classifier might apply to a feature, adding/deleting of features to examine, or the like. In one embodiment, many message classifiers are configured to provide a classification or prediction of a message, then, modify various weights, and/or other parameters, local to the message classifier based on feedback from the user on the message classifier's prediction. For example, the message classifier might indicate that a message is spam, but the user subsequently determines that the message is not spam and, for example, moves the message to an inbox from a spam folder. The actions of the user of moving the message may be used to train the message classifier for a next message. However, as described further, various embodiments of the message classifiers may employ weighted inputs from a community of other message classifiers to classify a message. One embodiment of a network diagram illustrating interactions between message classifiers within a community of message classifiers is described below in more detail in conjunction with FIG. 4.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple DMS 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

DMS 106 includes virtually any network computing device that is configured to manage messages received over a network. In one embodiment, DMS 106 may include a message server that is configured to receive messages and route them to an appropriate client device, or the like. Thus, DMS 106 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, and the like. However, DMS 106 may also include a message server configured and arranged to manage other types of messages, including, but not limited to SMS, MMS, IM, or the like.

DMS 106 may further include one or more message classifiers useable to classify received messages and organize them into different message folders based, in part, on the classification. Such classification may include predictions that the message is a spam message, a bulk message, a ham message, or the like. DMS 106 may then send the message to a message folder based on the classification. A user associated with a user account for the message folder may provide feedback regarding the classification of the message. DMS 106 may enable the feedback to be used to modify characteristics of one or more message classifiers. DMS 106 may also employ several message classifiers to generate a single message prediction of a given message. In one embodiment, DMS 106 may send a message that is intended for a user account to classifiers associated with other user accounts. DMS 106 may send the message transparently to the other classifiers to obtain a message prediction from the other classifiers. That is, in one embodiment, the message may be sent to the other (global) classifiers in a manner that preserves privacy of the message from other users, and may further employ the other classifiers in a manner that is transparent or otherwise unknown to a user associated with the other classifiers.

DMS 106 may employ a weighting mechanism to combine the plurality of message predictions to generate a single message prediction useable to organize the message into a message folder. DMS 106 may employ a structure of classifiers substantially similar to that described below in conjunction with FIG. 4 to perform such classifications of messages. Furthermore, DMS 106 may employ a process such as that described below in conjunction with FIG. 5 to employ a community of classifiers to predict a classification of a message. By employing a community of classifiers various embodiments may be able to obtain the dynamic collective wisdom of the community to whether a message is span, ham, or another type of message.

Devices that may operate as DMS 106 include, but are not limited to personal computers, desktop computers, multiprocessor systems, microprocessor-based or programmable consumer electronics, network PCs, servers, network appliances, and the like.

Although DMS 106 is illustrated as a distinct network device, the invention is not so limited. For example, a plurality of network devices may be configured to perform the operational aspects of DMS 106. For example, in one embodiment, the message classification may be performed within one or more network devices, while the message server aspects useable to route messages may be performed within one or more other network devices. Moreover, message classifications may be performed using one or more of client devices 101-104, such as in a peer-to-peer configuration of "classifier" sharing, or the like. Thus, in one embodiment, classifiers residing at a client device may be made available to receive and classifier a message transparent to a user of that client device. In one embodiment, a user of a client device may select to opt out of such community use of their classifier. In another embodiment, a user may select to provide access to their classifier and/or various parameters, or other characteristics of their classifier, to a subset of a community, such as to friends (e.g., first degree of separation relations), or members of a particular organization, or the like. Thus, users may select to form various sharing groups, or alliances for use of their classifiers.

Illustrative Client Environment

Figure 2:
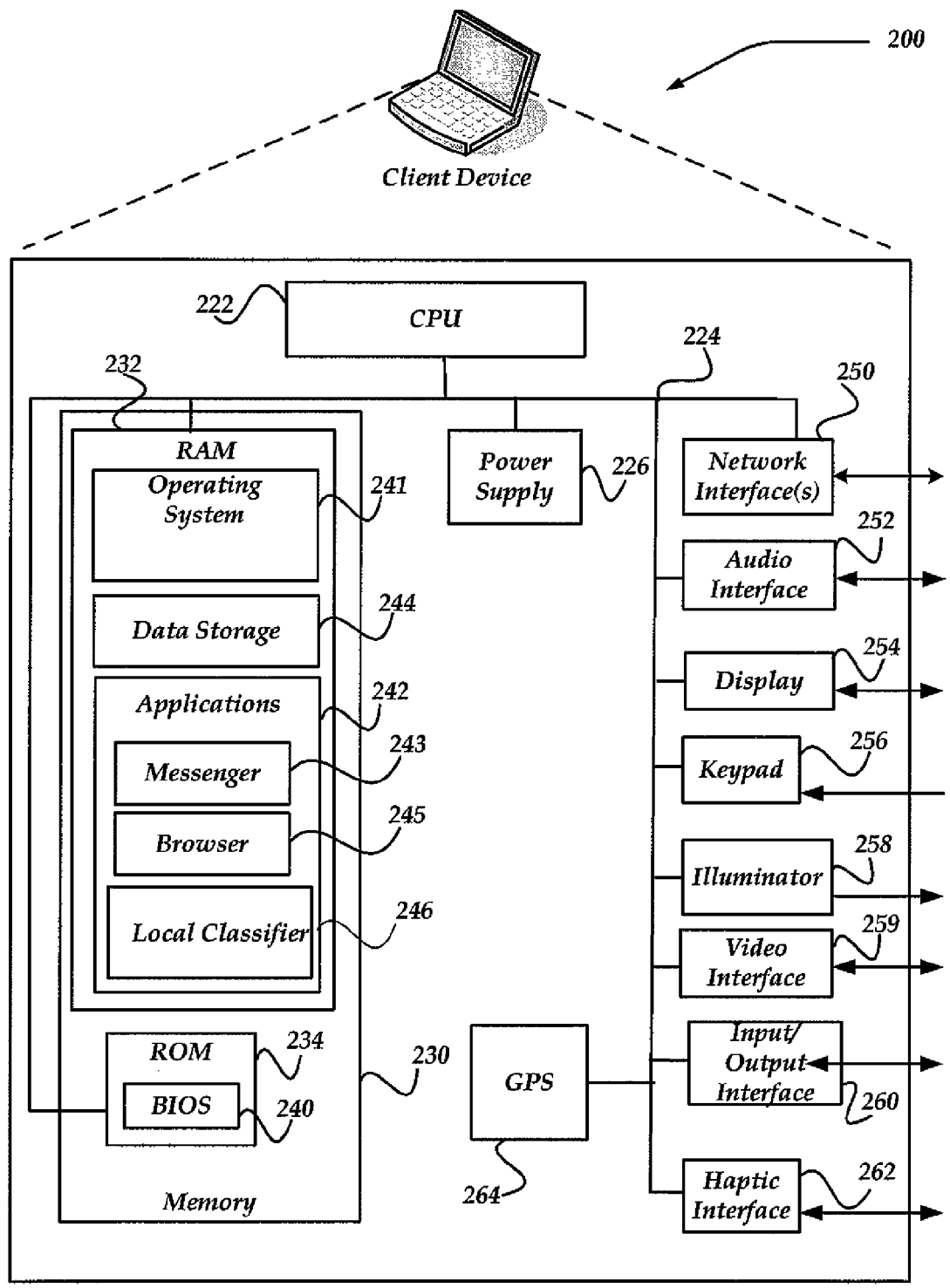
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgment for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 244 may also be employed to store personal information including but not limited to contact lists, personal preferences, data files, graphs, videos, or the like. Data storage 244 may further provide storage for user account information useable with one or more message addresses, message folders, or the like. Thus, data storage 244 may include various message storage capabilities to store and/or otherwise manage message folders, such as email folders for spam messages, ham messages, bulk messages, inbox messages, deleted messages, or the like. In one embodiment, data storage 244 may also store and/or otherwise manage local weighting parameters, and/or other data useable by local classifier 246 in predicting a message classification. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and local classifier 246.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. In one embodiment, messenger 243 may employ various message boxes or folders to manage and/or store messages.

Local classifier 246 may be configured and arranged to receive a message and to organize the message into a message folder based on a prediction of the message's classification. In one embodiment, local classifier 246 may reside within client device 200. In one embodiment, local classifier 246 may be downloaded onto client device 200 from any of a variety of sources. However, local classifier 246 may also reside remotely in another network device, such as DMS 106 of FIG. 1, Local classifier 246 however, may still be considered to be 'local' to a user message account for a user associated with client device 200. Thus, independent where local classifier 246 resides, local classifier 246 may still be configured and arranged to manage classifications of messages for at least one user account.

Moreover, in one embodiment, a user may employ global classifiers, associated with other users to assist in classifying the user's received messages, absent a local classifier. Where the user does employ a local classifier, it may be configured, in one embodiment, to employ predictions from a plurality of global classifiers in a configuration such as is described below in conjunction with FIGS. 4-5.

Illustrative Network Device Environment

Figure 3:
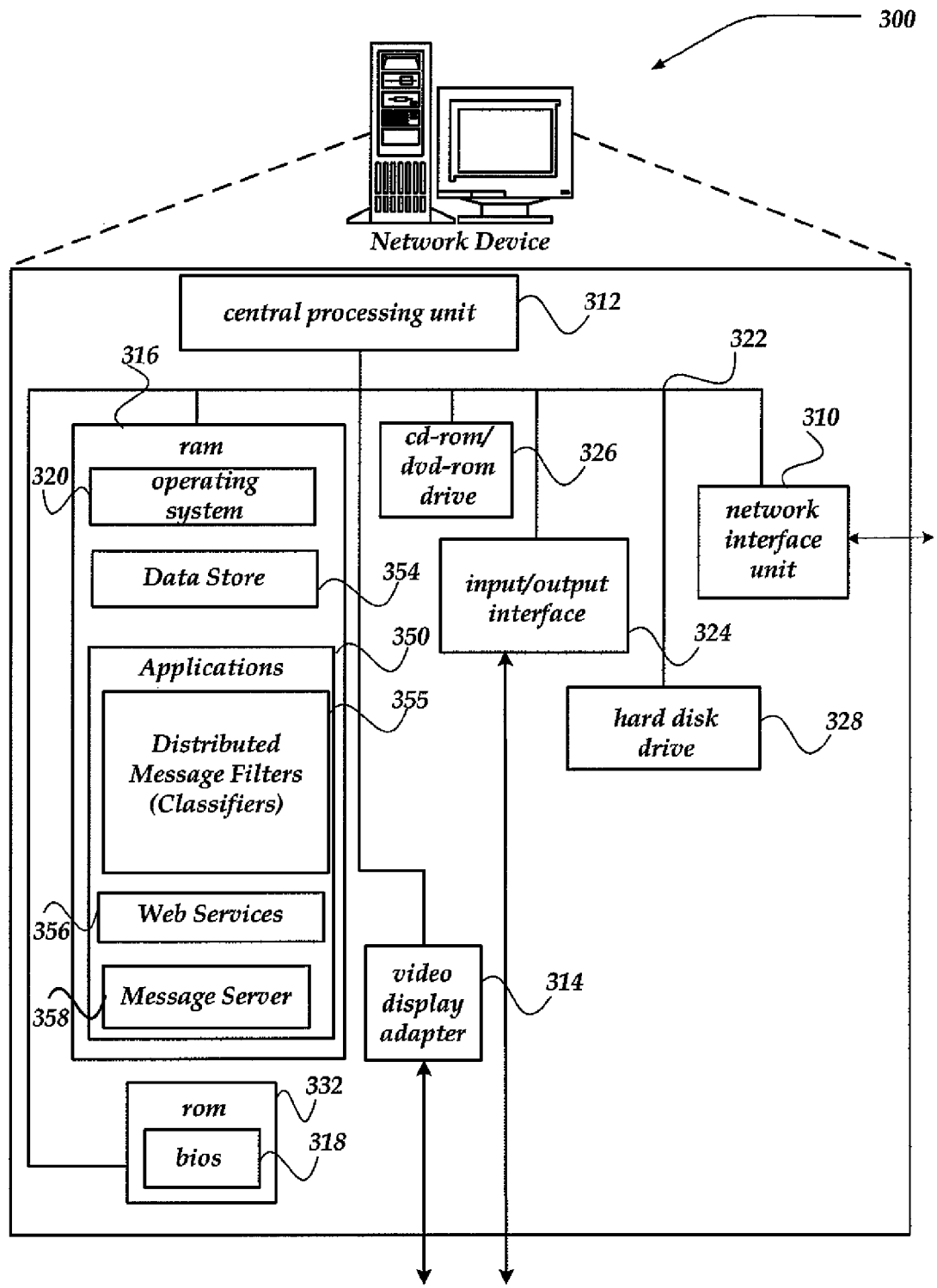
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent for example, DMS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and Distributed Message Filters (DMF) 355

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In one embodiment, web services 356 may interact with DMF 355 and/or message server 358 when a client device requests a message.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

In one embodiment, message server 358 and/or web services 356 may enable employ DMF 355 to organize messages for a user account into message folders based on a message classification. DMF 355 represents therefore, at least one message classifier, useable to predict a classification of a message. DMF 355, however, in another embodiment, may be configured and arranged to include a plurality of message classifiers arranged such as described below in conjunction with FIG. 4. In one embodiment, DMF 355 may also be configured to transparently provide a message to at least one classifier, or otherwise access parameters associated with at least one classifier that may reside in another network device, such as in a client device, or the like.

DMF 355 may further be configured to allow a user to train a classifier that may be 'local' to a user message account for the user. DMF 355 may also allow a user to specify whether their local classifier may be used by one or more other users in classifying messages for the one or more other users. DMF 355 may also allow the user to identify other users for which the user may have access to their classifiers for classifying received messages for the user. DMF 355 may also enable the user to modify a result of a classification using a variety of mechanisms.

Embodiment of Distributed Personal Spam Filtering Structure

Figure 4:
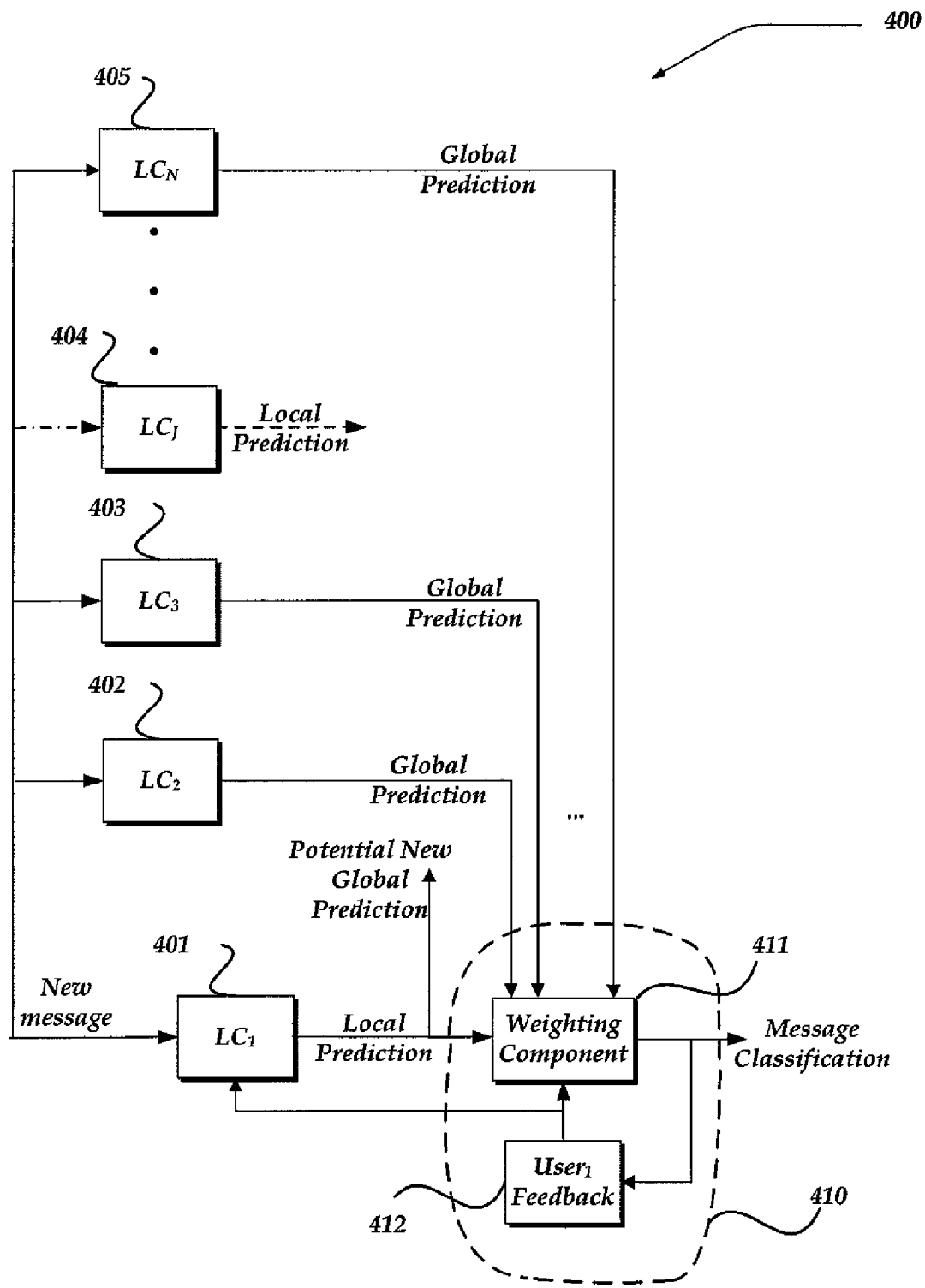
FIG. 4 illustrates a network diagram generally showing one embodiment of a plurality of local classifiers interacting to provide a distributed personal message filtering mechanism.

FIG. 4 illustrates a network diagram structure generally showing one embodiment of a plurality of local classifiers interacting to provide a distributed personal message filtering mechanism. Structure 400 of FIG. 4 may include many more components than those shown. The components shown, however, are sufficient to disclose an illustrative embodiment for practicing the invention.

Structure 400 includes local classifiers ($LC_{1-N}$) (401-405), and distribution component 410. Distribution component 410 includes weighting component 411 and user feedback component 412. As shown, while only a single distribution component 410 is illustrated, this is merely for simplicity and to improve the ease of understanding of structure 400. Thus, in one embodiment, one or more of $LC_{2-N}$ may also feed output to 'their own' distribution components substantially similar to distribution component 410. For example, $LC_N$ 405 may have its output fed into a distribution component that further receives inputs from one or more of $LC_{1-J}$ 401-404, without departing from the scope of the invention. In addition, $LC_{1-N}$ 401-405 may reside within a single network device, or be distributed across a plurality of network devices. Thus, structure 400 may be viewed as location independent.

Each of $LC_{1-N}$ 401-405 may be considered as local classifiers to different user message accounts. However, for purposes of discussion, consider that $LC_{2-N}$ 402-405 are 'global' classifiers to $LC_1$ 401. Then, as illustrated, a message may be received and provided to $LC_1$ 401. Moreover, the message may be sent to one or more of $LC_{2-N}$ 402-405 for use in obtaining a plurality of global predictions for the message. In one embodiment, the message might not be sent to each of $LC_{2-N}$ 402-405. For example, as illustrated (by the dashed input), the message might not be sent to $LC_J$ 404.

$LC_1$ 401 may perform a classification on the message providing a local prediction as to whether the message is spam, or some other type of message. In one embodiment, the local prediction may be provided to other classifiers, such as one or more of $LC_{2-N}$ 402-405.

As shown, a plurality of global predictions may be received by weighting component 411 along with the local prediction. Weighting component 411 may then employ a variety of mechanisms to combine the plurality of predictions to produce a single message classification of the receive message. The resulting single message classification may be employed to organize the message into a message folder associated with the user account.

As shown, user feedback component 412 may be used to modify/confirm the single message classification. The result of the user feedback component 412 may be fed back into weighting component 411 to modify weightings associated with the prediction inputs. The result of the user feedback component 412 may also be fed back to $LC_1$ 401 to modify/train $LC_1$ 401.

Generalized Operation

Figure 5:
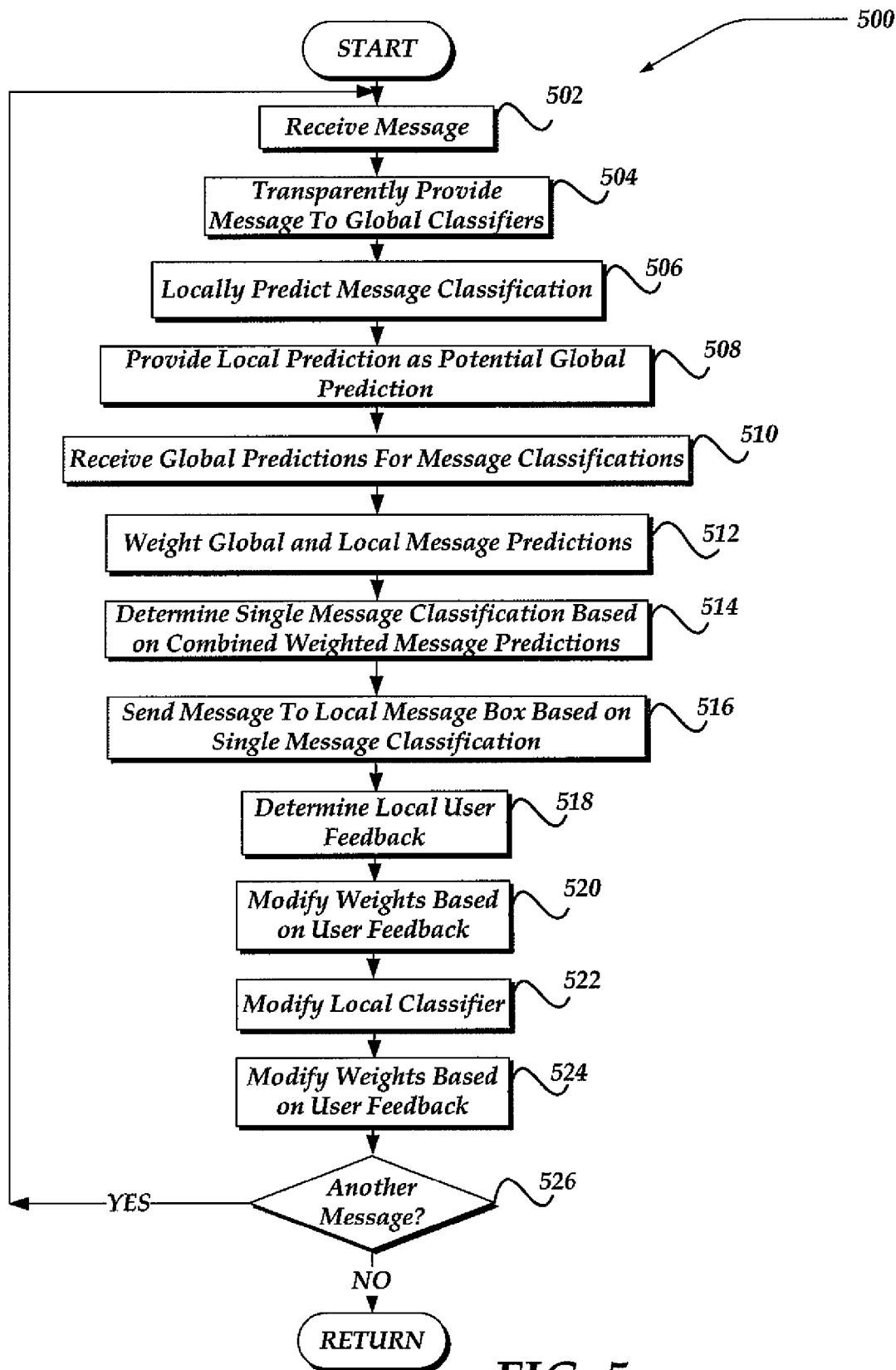
FIG. 5 illustrates a logical flow diagram generally showing one embodiment of a process for performing message filtering using weighted inputs from a plurality of distributed personal message filters with a weighted local message classifier input.

The operation of certain aspects of the invention will now be described with respect to FIG. 5. FIG. 5 illustrates a logical flow diagram generally showing one embodiment of a process for performing message filtering using weighted inputs from a plurality of distributed personal message filters with a weighted local message classifier input. Process 500 of FIG. 5 may be implemented within DMS 106 of FIG. 1, in one embodiment. In another embodiment, process 500 may be employed across one or more client devices, such as client devices 101-104. In still another embodiment, some of process 500 may be performed within DMS 106, while other portions of process 500 may be performed by one or more client devices.

Process 500 begins, after a start block, at block 502, where a message is received. In one embodiment, the message is received over a network with an intended recipient designated in a header or the like of the message, wherein the intended recipient is associated with a user account, user, user address, or the like. For illustration purposes, only, and not intended to narrow the invention, referring briefly to FIG. 4, it may be assumed that the message is destined for a user account associated with the local classifier 401, such as a first user account.

Processing flows next to block 504, wherein the message may be provided to a plurality of global classifiers such that each global classifier may be employed to provide a global prediction of the message. In one embodiment, the message is provided to the global classifiers transparently. That is the message is sent to the global classifiers in a manner transparent to a user associated with a given global classifier. As noted above, in this manner, the global classifiers may be used to provide a prediction, but the message, and the associated message prediction are not seen by a user associated with a respective global classifier. In this manner, privacy of the message may be maintained, while the benefit of community classifications of the message may be obtained.

Process 500 moves next to block 506, where the local classifier, to the first user account, may be employed to provide a local message prediction for the message. In one embodiment, the local message prediction may indicate whether the message is a spam message, ham message, or a bulk message. However, the invention is not constrained to classifying the message merely within these classifications, and others may also be employed. For example, in another embodiment, the message might also be classified as a junk message.

Continuing next to block 508, the local message prediction may be as a potential global prediction for use by at least one global classifier in the plurality of global classifiers. Processing the flows to block 510, where message predictions are received from each of the global classifiers in the plurality of global classifiers. It should be noted, that just as disclosed in FIG. 4, one or more global classifiers may be configured to not participate in providing its output to the community, or a subset of the community. For example, a global classifier may be configured to provide its message predictions to a selected set of friends, or the like, but not to others in a social network, or community. In one embodiment, therefore, that global classifier might not receive the message for classification. In such situations, those global classifiers that are identified as not participating may be excluded from the plurality of global classifiers that receive the message, and therefore of those that provide a message prediction.

In any event, processing flows to block 512, where the global message predictions and the local message prediction may be weighted based on weights based in part on user feedback about a previous message classification. In one embodiment, the weights may be further modified based on a regression analysis, a machine learning algorithm, or the like. The weighted message predictions may then be combined using a variety of mechanisms, including but not limited to the regression analysis, machine learning algorithm, Bayesian approach, nonparametric regression, or the like. Combing of the predictions may also be performed using boosting, without departing from the scope of the invention. In one embodiment, the weighting may also be determined based on a unit-weighted regression approach. Processing continues to block 514, where the weighted global message predictions and the weighted local message prediction are combined to determine a single message classification for the received message.

Continuing to block 516, the received message may then be sent to a message folder associated with the first user account for the local classifier based on the single message classification. For example, if the single message classification indicates that the message is a bulk message, the message may be sent to a bulk message folder. Similarly, if the message is determined to be spam, the message may be sent to a spam folder; or if the message is considered a good message, such as ham, or the like, the message may be sent to the first user account's inbox folder.

Processing flows next to block 518, where a user associated with the first user account may provide feedback regarding the classification of the received message. Such feedback may take any of a variety of forms. For example, where the message is classified as spam, ham, bulk, or the like, and the user concurs with the classification, the feedback might take the form of not moving the message to another folder. Thus, if the message remains in the designated folder for some determined period of time, the feedback of non-action may be used to confirm the classification. In another embodiment, if the user opens the message, but maintains the message in the designated folder, this action may indicate also that the message is properly classified. If the user deletes the message, and does not actively move the message into another folder— besides the deleted folder, then this action might also indicate feedback that concurs with the message classification. For example, the user might see messages in a spam folder and delete them, to save space, or for any other reason. Such action may be used as feedback to indicate the classification is proper. When the message is moved, however, from one folder to another folder by the user, this action may indicate that the message is improperly classified. Such actions also provide feedback. Feedback may also be obtained using a variety of other mechanisms, including, but not limited to highlighting one or more messages, and employing a widget, icon, button, form field, or the like, to classify and/or re-classify the one or more messages.

Moving to block 520, the feedback may be used to modify weights used for one or more global and/or local classifiers. Thus, if for example, the local (or one or more global) classifier determined that the message is spam, but the user re-classified the message to bulk, or not spam, the weighting for the local (or one or more global) classifier might be decreased to account for the improper classification from the local (or one or more global) classifier. Similarly, if the local or one or more global classifiers classified the message consistent with the feedback, the weighting for these classifiers might be increased.

Processing continues to block 522, where the feedback from the user may also be used to modify and/or train the local classifier. Thus, in one embodiment, various weights or the like may be modified to modify the local classifier.

Process 500 flows next to decision block 526, where a determination is made whether there is another message to be classified. If so, processing loops back to block 502; otherwise, processing returns to a calling process to perform other actions.

As noted above, each global classifier may operate as a local classifier for another user account. Thus, in one embodiment, each global classifier may also employ a process substantially similar to process 500 above.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage a delivery of a message over a network, comprising:
   a transceiver to send and receive data over a network; and
   a processor that is operative to perform actions, comprising:
   receiving a message over the network for at least a first user account;
   providing the message to a plurality of global classifiers, wherein each of the global classifiers is associated with user accounts other than the first user account;
   providing the message to a local classifier associated with the first user account;
   receiving a message prediction from each of the plurality of global classifiers and the local classifier;
   combining the message predictions from each of the plurality of global classifiers with the local classifier to determine a single message classification as to if the message is a spam message for the first user account; and
   selectively directing the message to the first user account based on the determined single message classification.

2. The network device of claim 1, wherein the processor is operative to perform actions, further comprising:
   receiving feedback from a user of the first user account about the single message classification;

modifying a weighting associated with a message prediction from at least one a global classifier or the local classifier; and
modifying the combining of the message predictions based on the modified weighting.

3. The network device of claim 1, wherein the processor is operative to perform actions, further comprising:
receiving feedback from a user of the first user account about the single message classification; and
training the local classifier based on the received feedback from the user.

4. The network device of claim 1, wherein at least one of the local prediction or the single message classification is sent to at least one of the global classifiers for use in determining another single message classification for another message associated with the at least one of the global classifiers.

5. The network device of claim 1, wherein combining the message predictions further comprises employing at least one of a regression analysis.

6. A processor readable storage medium that includes data and instructions, wherein the execution of the instructions on a computing device provides for managing messages over a network by enabling actions, comprising:
receiving a message for a first user account over the network;
providing the message to a plurality of global classifiers, wherein each of the global classifiers are associated with user accounts other than the first user account, and wherein the message is provided to the plurality of global classifiers transparent to each user associated with a respective global classifier;
providing the message to a local classifier associated with the first user account;
receiving a message prediction from each of the plurality of global classifiers and the local classifier;
combining weighted message predictions from each of the plurality of global classifiers with the local classifier to determine a single message classification as to if the message is a spam message for the first user account;
selectively directing the message to the first user account based on the determined single message classification; and
modifying the weighting of the message predictions based on a user feedback of the determined single message classification.

7. The processor readable storage medium of claim 6, wherein at least one of a global classifier employ a different message classification mechanism from the local classifier, selected from at least one of a naïve Bayes algorithm, a support vector machine algorithm, a logistic regression, a linear regression, neural network, decision tree, or a perceptron.

8. The processor readable storage medium of claim 6, wherein the determined single message classification from the local classifier is provided to a global classifier of the plurality of global classifiers for use in classifying at least one other message directed towards a second account associated with the global classifier.

9. The processor readable storage medium of claim 6, wherein the user feedback is further employed to train the local classifier for use in classifying another message.

10. The processor readable storage medium of claim 6, wherein selectively directing the message further comprises directing the message to at least one of a bulk message folder, an inbox folder, a spam message folder, or a junk message folder.

11. The processor readable storage medium of claim 6, wherein the local classifier is configured and arranged to be trained based on a plurality of other messages and a plurality of other user feedback associated with the first user account.

12. A method for managing a message delivery over a network, comprising:
receiving a message for a first user account over the network;
providing the message to a local classifier associated with the first user account;
transparently providing the message to a plurality of global classifiers, wherein each of the global classifiers is associated with user accounts other than the first user account;
receiving a message prediction from each of the plurality of global classifiers and the local classifier;
weighting each message prediction from each of the plurality of global classifiers and the local classifier, wherein the weightings are determined in part based on feedback from a user associated with the first user account;
combining the weighted message predictions to determine a single message classification indicating if the message is a spam message for the first user account; and
selectively directing the message to a message folder for the first user account based on the determined single message classification.

13. The method of claim 12, wherein combining the weighted message predictions further comprises employing a regression analysis.

14. The method of claim 12, wherein the message prediction from the local classifier is sent to at least one global classifier in the plurality of classifiers.

15. The method of claim 12, wherein one global classifier employs a different message classification mechanism than the local classifier.

16. The method of claim 12, further comprising:
modifying at least one parameter for the local classifier based on feedback from the user associated with the first user account based on the single message classification, wherein the at least one parameter is useable by the local classifier to determine another message prediction.

17. A mobile device for enabling a communications over a network, comprising:
a memory arranged to store data and instructions;
an input interface for receiving requests and sending responses; and
a processor arranged to enable actions embodied by at least a portion of the stored instructions, the actions comprising:
receiving a message for a first user account over the network;
providing the message to a local classifier associated with the first user account;
transparently providing the message to a plurality of global classifiers, wherein each of the global classifiers is associated with user accounts other than the first user account;
receiving a message prediction from each of the plurality of global classifiers and the local classifier;
weighting each message prediction from each of the plurality of global classifiers and the local classifier, wherein the weightings are determined in part based on feedback from a user associated with the first user account;

combining the weighted message predictions to determine a single message classification indicating if the message is a spam message for the first user account; and selectively directing the message to a message folder for the first user account based on the determined single message classification such that a user of the first user account is enabled to view the message at a display of the mobile device.

18. The mobile device of claim 17, wherein at least one of the plurality of global classifiers is associated with another user account other than the first user account that accessible through another mobile device.

19. The mobile device of claim 17, wherein the processor is arranged to enable further actions, comprising:

receiving at the mobile device a modification to the determined single message classification by a user of the mobile device associated with the first user account; and employing the modification to modify a weighting to at least one message prediction from at least one of the local classifier or at least one global classifier.

20. The mobile device of claim 17, wherein the processor is arranged to enable further actions, comprising:

receiving at the mobile device a modification to the determined single message classification by a user of the mobile device associated with the first user account; and using the modification to train the local classifier.

\* \* \* \* \*

UNITED STATES PATENT AND TRADEMARK OFFICE
CERTIFICATE OF CORRECTION

| | |
|---|---|
| PATENT NO. | : 8,108,323 B2 |
| APPLICATION NO. | : 12/123270 |
| DATED | : January 31, 2012 |
| INVENTOR(S) | : Kilian Quirin Weinberger et al. |

It is certified that error appears in the above-identified patent and that said Letters Patent is hereby corrected as shown below:

In column 17, line 2, in Claim 2, after "one" insert -- of --.

In column 18, lines 51-52, in Claim 17, delete "comprising;" and insert -- comprising: --, therefor.

Signed and Sealed this
Twenty-sixth Day of June, 2012

David J. Kappos
*Director of the United States Patent and Trademark Office*